R. MORRIS

Aug. 12, 1930. ROTARY DISPENSING BIN Re. 17,769

Original Filed Jan. 19, 1927

INVENTOR
Ross Morris
BY
Pierre Barnes
ATTORNEY

Reissued Aug. 12, 1930 Re. 17,769

UNITED STATES PATENT OFFICE

ROSS MORRIS, OF ZILLAH, WASHINGTON

ROTARY DISPENSING BIN

Original No. 1,656,444, dated January 17, 1928, Serial No. 162,018, filed January 19, 1927. Application for reissue filed January 14, 1930. Serial No. 421,562.

This invention relates to a rotary bin from which articles such as apples or the like are dispensed to an operator for packing the same in boxes.

The object of the invention, generally, is to provide improved means of this character whereby the work of the box packer is facilitated by rendering the handling of the articles more convenient and reducing the amount of labor.

The invention consists in a bin comprising a rotary casing enclosing a rotary tray which is arranged for individual vertical movement responsive to the weight of articles deposited therein to present the articles at a substantially constant height.

The invention further consists in the provision of improved means for automatically delivering articles, such as apples for example, into the bin in a manner to obviate any liability of injuring the articles by bruising or otherwise.

The invention further consists in the novel construction, adaptation and combination of parts hereinafter described and claimed.

In the accompanying drawing,—

Figure 1:
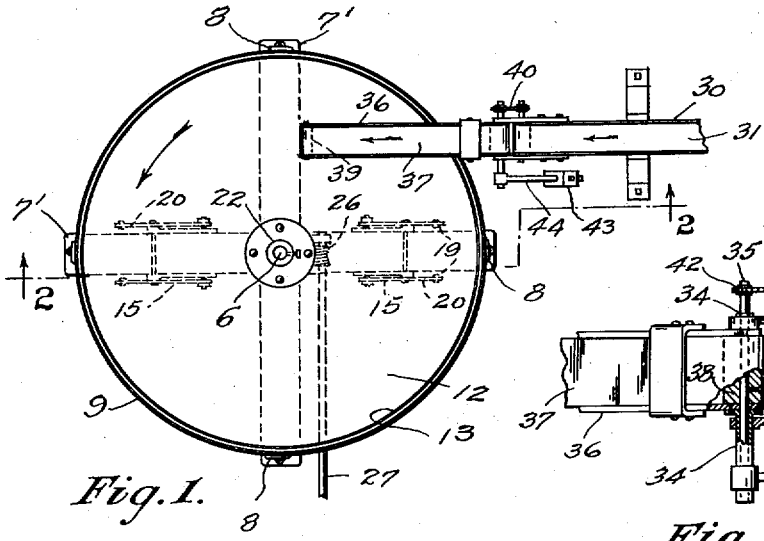
Figure 3:
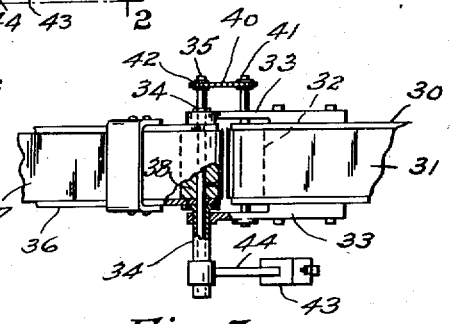
Figure 2:
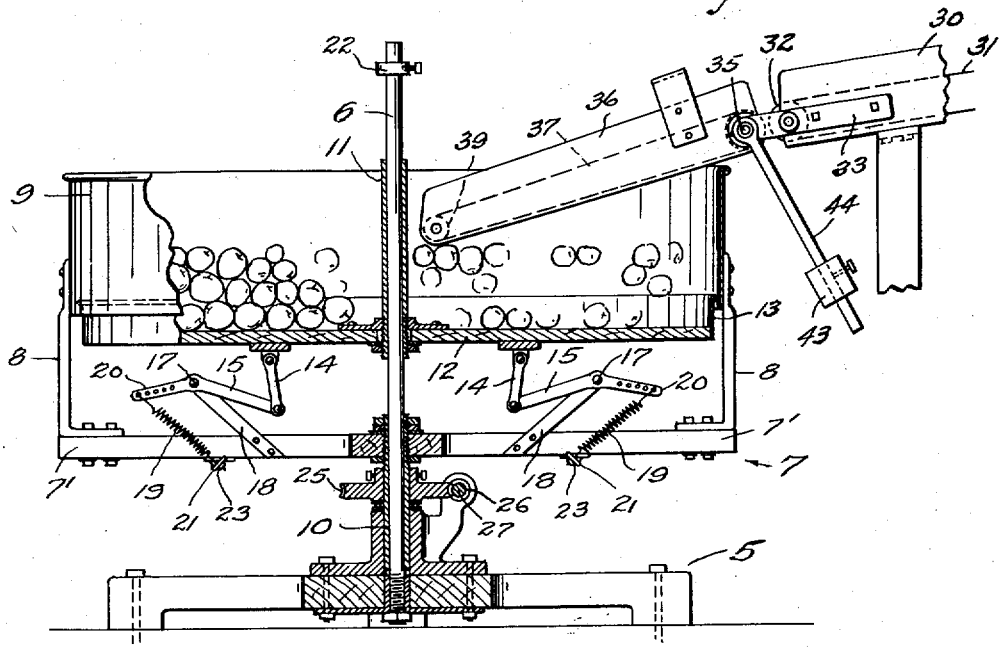

Figure 1 is a plan view of devices embodying the present invention; Fig. 2 is a transverse vertical section, to an enlarged scale, taken substantially on line 2—2 of Fig. 1; and Fig. 3 is a view partly in plan and partly in horizontal section of portions of the feeding appliances illustrated in the preceding views.

In said drawing, the reference numeral 5 represents the base member of a stand having rigidly secured thereto a vertical column 6. Mounted to rotate upon said column is a frame 7, herein shown as consisting of two horizontal bar members 7 secured in rectangular relation with each other to the upper end of a sleeve 10 through which said column extends.

Secured to and extending upwardly from the ends of said frame members are vertical post elements 8 which support an annular casing 9 concentrically of the column 6.

Rotatable upon the column above said frame is a sleeve 11 constituting the hub of a circular tray having a floor 12 and, preferably, a peripheral wall 13.

This tray is of less diameter than the internal diameter of the casing 9, permitting vertical movement of the tray within the casing. Said tray is coupled with the frame 7 to rotate in unison therewith by means of links 14 depending from the tray and connected to arms 15 of levers which are fulcrumed at 17 to bars 18 which are secured to one of the frame members 7′ at opposite sides of the column. Such connection also affords vertical movement to the tray and, by the provision of springs 19, the tray is yieldingly supported for vertical movement.

As shown, one end of each spring is connected to an arm 20 of the respective lever, and the other end is connected to an attachment 21 of the frame. The tray supporting connections above described are disposed advantageously in pairs at opposite sides of the respective arms of one of the frame members. When the tray is without a load the power of said springs suffice to retain the tray to have its hub 11 engage against a stop collar 22 provided upon the column 6.

The stop collar may be secured to the post at a height to regulate the extent of elevation of the tray to accommodate operators of different stature.

When the tray is supplied with apples or other articles, the weight of the same will act to depress the tray so that the upper surface of the load will at all times be at the same elevation, or nearly so, responsive to the weight of the load. The power of each of the springs suitable to its duty may be regulated by means of a nut 23 taking screw threads provided on an end of a spring and bearing against the undersides of the respective attachment 21 or by engaging the springs in selected series spaced apart of apertures provided in the arms 20.

The frame and the tray which is supported thereby are arranged to be rotated in unison as by means of a worm gear 25 secured to the sleeve member 11 of the rotary frame and a worm 26 which is mounted upon a power driven shaft 27.

Included in the invention is a feeding means comprising a trough 30 extending from a sorting table or other source of supply (not shown). Operating in said trough is a power driven conveyor-belt 31 which passes around an idler pulley 32 at the discharge end of the trough. Secured to said trough and protruding beyond its discharge end are bracket pieces 33 which serve to support bearing boxes 34 in which is journaled a transversely arranged shaft 35. Said bearing boxes are rigidly secured to the sides of a delivery trough 36 in which operates an endless conveyor-belt 37 which passes about a driving pulley 38 rigidly mounted upon the shaft 35 and also about an idler pulley 39 which is mounted upon a shaft or axle at the discharge end of the delivery trough.

As shown, the belt 37 of the delivery trough is driven through the medium of an endless chain 40 passing about sprocket wheels 41 and 42 which are mounted respectively upon the shafts of the pulleys 32 and 38 of the respective conveyor belts.

43 represents a weight secured to an arm 44 extending from one of the bearing boxes 34, said weight functioning to counter balance, in part, the weight of the discharge end of the delivery trough.

Said delivery trough extends, as shown, somewhat tangentially into the space enclosed by the casing 9 for delivering articles into the latter above the tray.

In operation, the discharge end of the delivery trough 36 assumes a position at or slightly above the floor of the tray, and as the articles accumulate thereon to various depths the articles in their revoluble travel upon the trough engage the sloping under surface of the trough to effect the gradual elevation of its delivery end so as to obviate any considerable amount of fall to the apples being discharged from the trough.

The invention is particularly adapted for use in supplying apples to a person for packing them into boxes because the tray rising and descending responsive to the weight of the apples, and also because it revolubly carries the apples within convenient reach of the operator to enable him to readily make selections of apples as to size, shape or color without unduly extending his reach.

While I have described the invention in its form now preferred by me, I do not wish to confine myself specifically thereto except as limited by the scope of the appended claims.

What I claim is—

1. The combination of a tray arranged to rotate about a vertical axis, an annular wall surrounding said tray and disposed concentrically with respect to said axis, spring controlled means supporting the tray for axial movement, and means for rotating said wall and the tray in unison.

2. The combination of a tray arranged for vertical and rotary movements, an annular wall surrounding the tray, said wall and tray being connected with each other for conjoint rotary movement and permitting vertical movement of the tray with respect to the wall, resilient means supporting said tray, and means for feeding articles within the space enclosed by said wall and above the tray.

3. A tray, an annular wall surrounding the tray, said tray and wall being arranged for unitary rotary movement about a vertical axis, and resilient means supporting the tray, said means being yieldable to a load deposited upon the tray and adapted to support the latter at elevations in inverse proportion to the weight of said load.

4. The combination of a tray having a peripheral wall element, means for rotating said tray about a vertical axis, vertically yieldable means for supporting the tray, and means to deposit articles upon said tray, the last named means comprising a trough containing conveying devices, said trough having a vertically movable member extending above the tray.

5. The combination of a base member, a frame mounted above the same for rotary movement upon said base member, an annular casing supported by said frame at a definite elevation, a tray supported by said frame for relative vertical movement within said casing, resilient means interposed between the frame and the tray and tending to yieldably retain the latter in its most elevated position, and means for driving the frame to impart coincident rotary movement to both the casing and the tray.

6. The combination of a base member, a vertical column rigid with said base member, a frame mounted for rotary movement upon said column, a tray connected for rotary movement to said column, devices coupling said tray with the frame for conjoint rotary movement, springs cooperating with said devices and permitting vertical movement to the tray with respect to said frame, and means for driving the frame to rotate the tray.

7. The combination of a circular table having a peripheral wall and constituting therewith a tray, yieldable means including a spring for supporting the tray, means for rotating the tray, and means for depositing articles upon the tray.

8. The combination of a tray having a peripheral wall element, means for rotating said tray about a vertical axis, and means to deposit articles upon said tray, the last named means comprising a trough containing conveying devices, said trough having a vertically movable member extending above the tray.

9. In a dispensing bin the combination of a movable bin for receiving articles and conveying them to a point of handling, and means for supplying articles to said bin, the discharge end of said supply means resting on the articles in said bin as its sole support and movable vertically relative to the bin by contact with articles therein to compensate for varying levels of articles in said bin.

10. In a dispensing bin, the combination of a rotary bin for receiving fruit and conveying it to a point of handling, and a chute for supplying fruit to said bin, said chute having a movable discharge portion resting lightly on the surface of the fruit in said bin and movable in a vertical plane to compensate for various levels of fruit in said bin.

11. In a dispensing bin, the combination of a rotary bin for receiving fruit and conveying it past a point of manual removal, and a conveyor for delivering fruit to said bin, said conveyor having a pivotally mounted chute resting lightly at its discharge end on the surface of the fruit in the bin to accommodate various levels of fruit to thereby avoid bruising the fruit delivered to the bin, and means to compensate for the weight of the chute to avoid bruising the fruit in the bin contacting with the discharge end of the chute.

12. A dispensing device comprising a movable container for receiving and distributing loose material, a feeding and directing device for delivering loose material to said container, a support for said feeding device, a connection securing said feeding device to said support to permit said feeding device to have movement relative to said container, the movement being imparted thereto by contact with material in said container through any changing level of the material flowing from said feeding device into said container.

13. In an apparatus for packing fruit comprising a rotating bin to receive assorted fruit and present it to an operator, a movable member for supplying fruit to said bin without injury, one end of which rests lightly on deposited fruit in said bin and is raised or lowered by contact therewith according to any changing level of the fruit as deposited or removed from said bin.

14. In a dispensing bin, the combination of a movable bin for receiving articles and conveying them to a point of handling and means for supplying articles to said bin the discharge end of which rests lightly on deposited articles and is movable relative to deposited articles by contact therewith adapting it to deposit articles in said bin without injury.

15. In an apparatus for packing fruit comprising a receptacle for receiving fruit and presenting it to an operator, a member for supplying fruit to said receptacle, means for imparting relative movement between said receptacle and said supply member, said supply member resting lightly or floating on fruit deposited in said receptacle and being moved by contact therewith according to the changing level of fruit in said container.

In testimony whereof I affix my signature.

ROSS MORRIS.